No. 824,241. PATENTED JUNE 26, 1906.
W. E. GREER.
VEHICLE WHEEL.
APPLICATION FILED OCT. 6, 1905.

Witnesses:
A Percy Buchtel.
Glenara Fox.

Inventor:
W. E. Greer,
by C. E. Humphrey
Atty.

UNITED STATES PATENT OFFICE.

WILLIAM E. GREER, OF AKRON, OHIO, ASSIGNOR OF ONE-HALF TO GEORGE H. CONRAD, OF COVENTRY TOWNSHIP, SUMMIT COUNTY, OHIO.

VEHICLE-WHEEL.

No. 824,241.

Specification of Letters Patent.

Patented June 26, 1906.

Application filed October 6, 1905. Serial No. 281,656.

*To all whom it may concern:*

Be it known that I, WILLIAM E. GREER, a citizen of the United States, residing at Akron, in the county of Summit and State of Ohio, have invented new and useful Improvements in Vehicle-Wheels, of which the following is a specification.

This invention relates to vehicle-wheels provided with pneumatic tires of elastic material, and more particularly pneumatic tires of the double-tube type having contractible, inextensible, or semi-inextensible bands or edges; and the object thereof is to so construct the wheel as to enable the tire to be very quickly applied or removed when necessary.

The invention further aims to provide a wheel of the class referred to with a new and improved means for retaining the tire, hereinafter more specifically described, in position on the wheel-rim, said means fixedly secured in the tire in position so that it will not be displaced in any manner, said means being detachable, so as to permit the ready removal of the tire from the rim of the wheel at any time and for any cause.

The invention further aims to provide a wheel of the class referred to preferably having a flat outer rim or periphery on which the tire may be seated, said wheel being further provided with annularly-formed side flanges to sustain the tire in position on the rim, said side flanges being removably held in position with respect to the rim so that a tire seated thereon may be readily drawn sidewise from its position on the rim upon a removal of one or both of the side flanges.

The invention further aims to mount on the rim a peculiarly-shaped ring securely anchored against circumferential motion with respect to the rim which will serve to retain the bands or edges of the tire in such engagement with the side flanges of the rim that the same whether inflated or not cannot be accidentally displaced from its seat on said wheel-rim.

With the foregoing and other objects in view the invention consists of the novel construction, combination, and arrangement of parts constituting the invention, to be hereinafter referred to and illustrated in the accompanying drawings, which form a part of this specification, in which is shown the preferred embodiment of the invention; but it is to be understood that changes, variations, and modifications can be resorted to which come within the scope of the claims hereunto appended.

Figure 1:
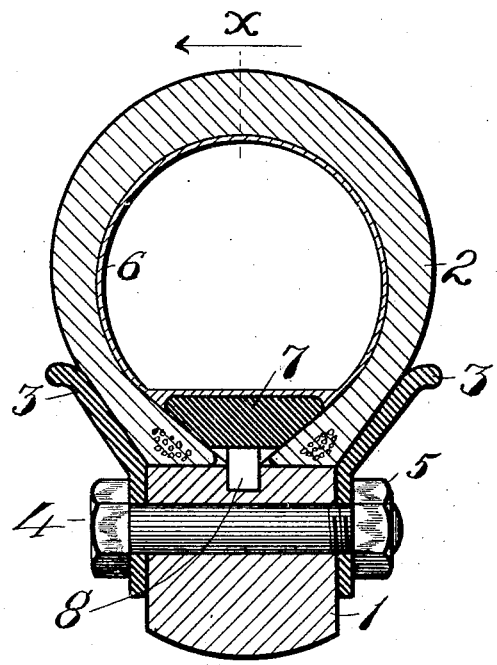
Figure 2:
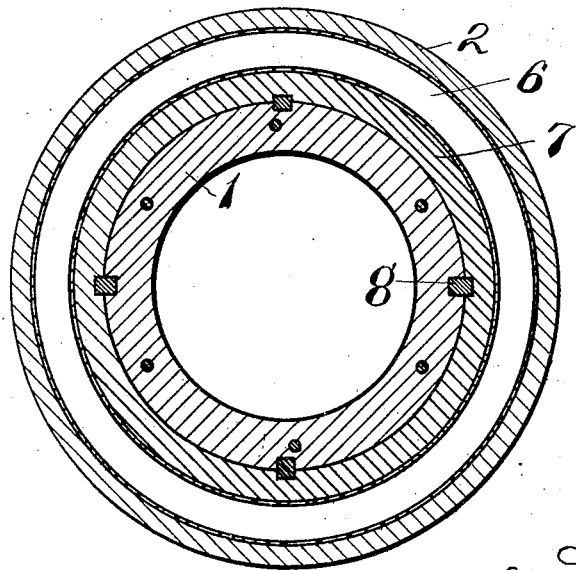

In the drawings, in which similar reference-numerals indicate like parts in the different figures, Figure 1 is a cross-section of a rim and tire portion of a wheel constructed in accordance with this invention, also showing in section the holdfast means for securing the tire, said holdfast means being arranged in operative relation with respect to that form of tire known as the "Dunlop" type; and Fig. 2 is a longitudinal section of a wheel-rim and tire portion of a wheel at the line X of Fig. 1.

Referring to the drawings, the reference character 1 denotes a wheel provided with a flat rim on which the bands or edges of the outer tube 2 of the tire are seated. The outer tube 2 of the tire is prevented from sidewise displacement on the rim 1 by means of two annularly-formed side flanges 3, which are retained in place by means of bolts 4, passing through the wheel-rim 1. These bolts 4 are tightened by ordinary nuts 5. The outer tube 2 of the tire incloses an inflatable inner tube 6 in the ordinary manner, and this tube is inflated through a suitable valve-stem which it is not deemed necessary to show, as it may be of any ordinary or preferred type.

It will be seen that the holding of the bands or edges of the outer tube 2 on the wheel-rim 1 by means of the annularly-formed side flanges 3 will secure them against lateral movement, and in order to lock them against outward displacement from their seat on the rim 1 I place between them a ring 7, having a cross-sectional conformation substantially in the form of an inverted frustum of a cone, with the narrower flat face thereof bearing upon the rim 1 between the two bands or edges of the tube 2. The internal diameter of this ring 7 will be such as to just nicely pass over the outer face of the rim 1.

It will be seen that the placing of this ring 7 between the bands or edges of the tube 2 absolutely prevents the withdrawal of the same from their seat on the rim 1 unless one of the flanges 3 is removed to permit sidewise movement thereof.

In order to prevent circumferential movement of the ring 7 on the rim 1, there is placed at selected intervals in the outer periphery thereof one or more lugs 8, and I cut transversely in the inner face of the ring 7 corresponding grooves or notches, so that when the ring 7 is seated on the rim 1 the grooves in the ring 7 will be in operative relation with the lugs 8 and absolutely lock the ring 7 against circumferential motion.

In assembling a wheel containing this invention one of the side flanges 3 is removed, and one of the bands or edges of the outer tube 2 is pushed sidewise over the face of the rim 1. The inner tube 6 is then placed within the cavity of the tube 2 and the ring 7 slipped sidewise onto the rim 1, care being taken to so place the ring 7 that the grooves therein will be in operative relation with the lugs 8, and then the outer edge or band of the outer tube 2 is placed in position, as shown in Fig. 1, and the flange 3, which had previously been removed to permit the assembling, is placed in position and the nuts 5 tightened thereon.

It will be found preferable to make the bands or edges of the outer tube 2 of such a thickness that when the flange 3 is forced inward by the influence of the nuts 5 it will compress them against the inclined faces of the ring 7, and thus secure the tire itself by reason of its frictional engagement with the ring 7 and flanges 3 from circumferential motion on the rim.

What I claim, and desire to secure by Letters Patent, is—

1. A vehicle-wheel comprising a rim forming a seat for a tire, keys arranged at suitable intervals on the periphery of said rim, detachable side flanges constituting in connection with said rim a channel, a detachable tire mounted on said rim and having side bands or edges, a ring having outwardly-inclined side faces mounted on said rim between said side bands or edges, and further provided with notches extending transversely throughout its inner face for engagement with the keys and when said ring is slid laterally onto said rim said keys will engage in the notches, thereby locking said ring against circumferential movement.

2. A vehicle-wheel comprising a rim forming a seat for a tire and having a recess, detachable side flanges constituting a channel in connection with said rim, a detachable tire mounted on said rim and having side bands or edges, a ring having inverted frusto-conically-shaped cross-sectional configuration mounted on said rim between said side bands or edges, said ring having a groove extending transversely throughout the width thereof and at its inner face, and a lug mounted in the recess in the rim for engagement with the groove in the ring and when the latter is slid laterally onto said rim, said lug will engage in said groove and lock said ring against circumferential movement.

In testimony whereof I have hereunto set my hand in presence of two subscribing witnesses.

WILLIAM E. GREER.

Witnesses:
C. C. FREDERICK,
C. E. HUMPHREY.